Dec. 27, 1966   L. A. BARNES   3,293,877
REFRIGERANT FLOW CONTROL MEANS
Filed Aug. 13, 1964   4 Sheets-Sheet 2

INVENTOR.
LOYD A. BARNES
BY William J. Miller
ATTORNEY

INVENTOR.
LOYD A. BARNES
BY William J. Miller
ATTORNEY

United States Patent Office 3,293,877
Patented Dec. 27, 1966

3,293,877
REFRIGERANT FLOW CONTROL MEANS
Loyd A. Barnes, Ponca City, Okla., assignor to Continental Oil Company, Ponca City, Okla., a corporation of Delaware
Filed Aug. 13, 1964, Ser. No. 389,265
12 Claims. (Cl. 62—223)

This invention relates to improvements in the art of temperature control, and more particularly, but not by way of limitation, it relates to an apparatus for effecting precise temperature control of an enclosed space.

The prior art teaches various applications of refrigeration principles for the purpose of controlling the temperature of a given space. It is also known to use automatic control for regulating the space to a desired temperature. The present invention extends the teachings in several areas of refrigeration techniques to provide a chamber or space which is capable of maintaining a very low temperature at a nearly constant level. It provides a controlled temperature environment that is continuously adjustable and sufficiently stable down to temperatures as low as minus (−) 175 degrees centigrade. The apparatus exhibits a reliability suitable for the conducting of scientific studies and, in particular, has given good performance when used for low temperature chromatographic studies and tests of low temperature controlling techniques.

The present invention contemplate apparatus providing a precision-controlled low-temperature chamber which can be controlled by intermittent application of a liquid coolant, the controlled application being carried out in such a manner that the thermal characteristics of the system allow the maintenance of very low chamber temperatures with negligible temperature variation. In a more limited aspect, the invention contemplates a low-temperature, controlled-environment chamber surrounded by an insulated coolant circulation space wherein the liquid coolant is circulated in an evaporator coil and finally dispersed in its gaseous state to be circulated around the coolant circulation space. The coolant dispersal is controlled in such a way, by critical location and energization of a thermal sensor, that temperature overshoot is greatly minimized. Also, the invention makes provision for the use of a second or tandem control whereby the temperature overshoot is corrected to an even greater degree.

It is an object of the invention to provide an environmental chamber having highly efficient and stable temperature control.

It is another object of the invention to provide a temperature-controlled chamber utilizing novel insulation and coolant distribution techniques.

It is yet another object of this invention to provide a temperature controlled enclosure which will stabilize at a low temperature without operator attention and within a minimum of time.

It is still another object of this invention to provide novel temperature control techniques wherein a more constant low-temperature level may be maintained.

Finally, it is an object of this invention to provide a temperature controlled environmental chamber having a more rapid response to temperature changes and being capable of counteracting temperature overshoot and excursions from the desired control level.

Other objects and advantages of the invention will be evident from the following detailed description when read in conjunction with the accompanying drawings which illustrate the invention.

Figure 1:
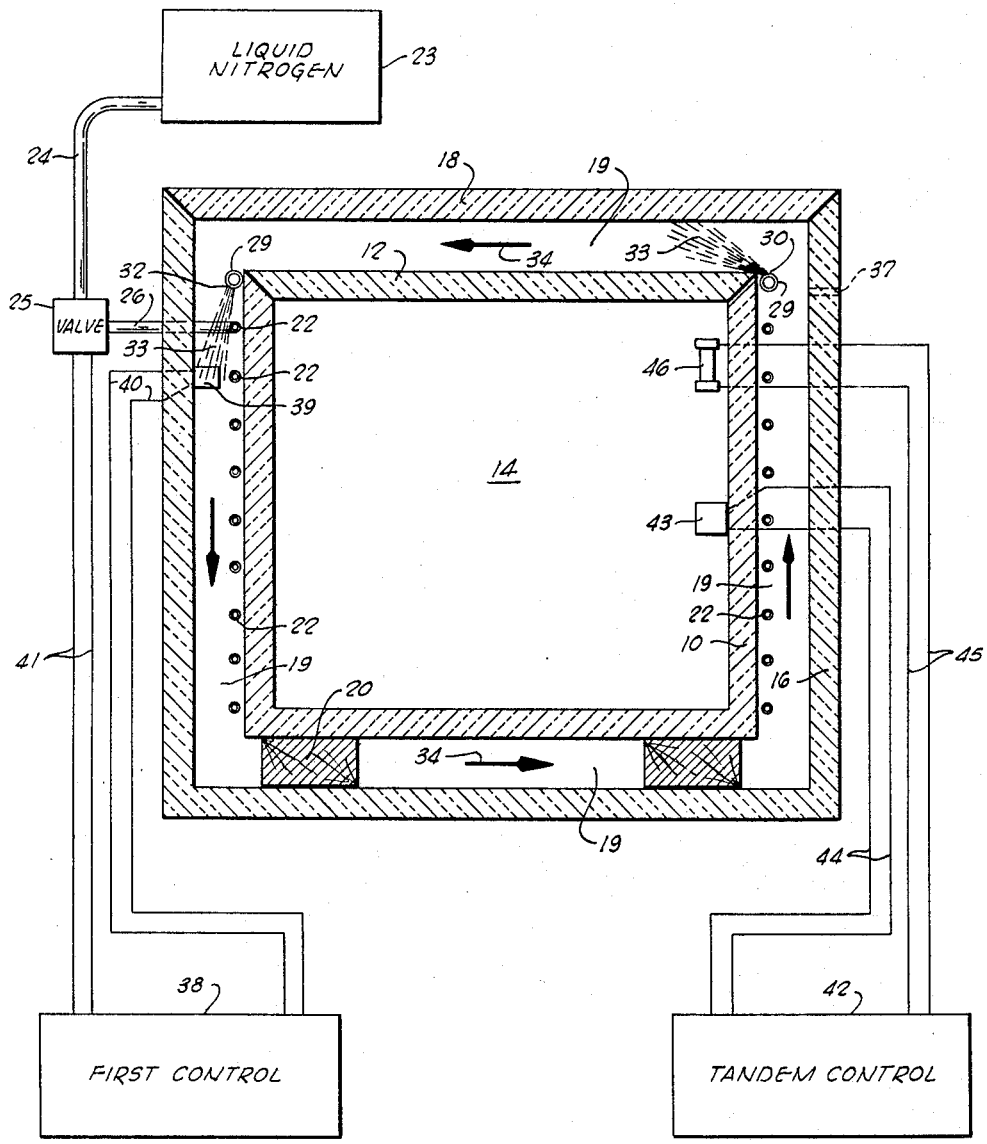
FIG. 1 is a schematic illustration of an environmental chamber and temperature control system constructed in accordance with this invention with the environmental chamber being shown cut away along a vertical plane.
Figure 2:
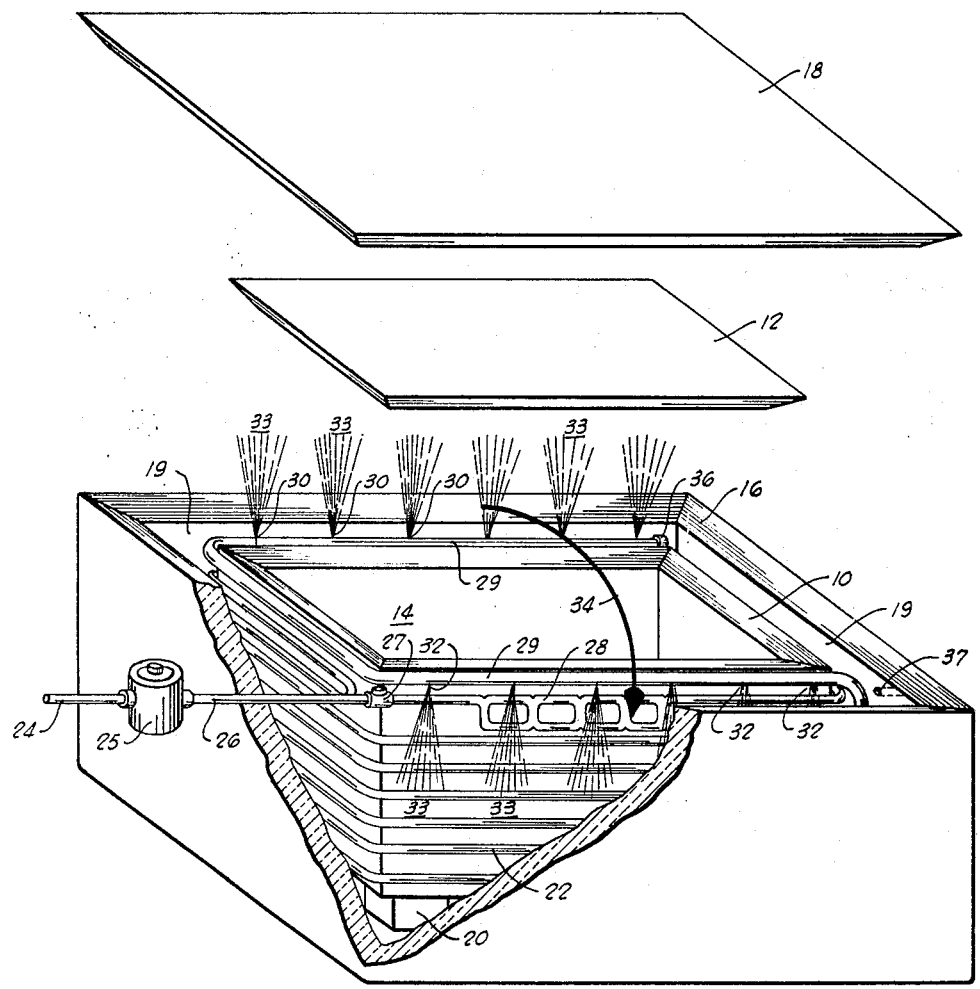
FIG. 2 is a partially cut-away, perspective and exploded view of the chamber and cooling system of FIG. 1.

Referring to the drawings in detail, and particularly FIGS. 1 and 2, reference character 10 designates a first-heat-insulative enclosure or housing having a tightly fitting lid 12 which forms the temperature controlled space or chamber 14. A second heat-insulative enclosure or housing 16 (having a lid 18) of slightly larger volume is situated to completely and symmetrically enclose the first enclosure 10 (and lid 12) while maintaining a circulation space 19 between all corresponding surfaces of the two enclosures. The enclosure 16 and lid 18 should have dimensions such that all of the interior surfaces of enclosure 16 and lid 18 will be spaced from one to two inches from the corresponding exterior surfaces of the enclosure 10 and lid 12. Spacer blocks 20 are situated at each bottom corner of enclosure 10 to maintain the equal spacing of all surfaces. In a constructed embodiment, the enclosure 10 and enclosure 16, and their respective lids, have been fabricated from styrofoam, but other suitable heat-insulative material can be used.

There is thus provided, between enclosure 10 and the outer enclosure 16, a circulation space 19 which is sufficient to allow (i) a passageway for gas circulation around all sides of the inner enclosure 10 and lid 12 and (ii) additional space to allow for placement of an evaporator coil or conduit 22. The coil 22 may be formed from suitable tube stock, such as copper or aluminum, in the manner of the well-known home refrigerator coil, and it is placed so that it is spirally wound to closely surround four sides of the enclosure 10. Liquid coolant, from a liquid nitrogen source 23, flows through a tube 24 to a solenoid-controlled valve 25 where it can then be intermittently applied through an entry tube 26 and connector 27 (see FIG. 2) to the evaporator coil 22. At the source end of coil 22 a moisture trap 28 is provided to protect against ice accumulation in the coolant flow line, and from that point the coolant is conducted through the multiple loops of coil 22 around the enclosure 10.

Connected to the output end of the coil 22 and located at the top of the enclosure 10, there is attached a length of exhaust tubing 29 of sufficient length that each of two sections disposed on opposite sides of the enclosure 10 may be made to have a series of gas exhaust orifices 30 and 32. The orifices 30 and 32 are oriented in the same circumferential direction, i.e., relative to the enclosure 10, so that escaping jets of gas 33, from the two series of orifices 30 and 32, will tend to aid and thereby set up a circulation flow of coolant gas as indicated by the dark arrow 34. The exhaust tubing 29 is blocked at the end by a suitable cap 36. A small restricted orifice 37 is provided in one wall of the enclosure 16 to allow escape of the exhausted gas at a controlled rate.

A first control 38 actuates the solenoid-controlled valve 25 to intermittently admit the liquid coolant from tube 24 into the entry tube 26 and thence the cooling system; i.e., evaporator coil 22, exhaust tube 29 and the gaseous coolant circulation space 19. The first control 38 regulates in response to a temperature sensor or thermistor 39 which is connected via leads 40 as one leg of an A.-C. bridge circuit as will be described in the detailed description of FIG. 3. The thermistor 39, upon reaching a certain preset low temperature, will cause energization of a relay (not shown) in first control 38, thereby removing power from the solenoid actuation leads 41, closing the valve 25 and ceasing the flow of coolant into the cooling system. As the system warms up, it is so sensed by thermistor 39 and the first control 38 shifts to the alternate operation whereby valve 25 is opened and coolant flows into the system. In connection with the operation of first control 38 there are certain important features which allow temperature trend anticipation and this will be more fully described below.

A second or tandem control 42 is also used for temperature control and its function is to apply heat in variable small amounts in order to further minimize temperature excursions. When the liquid nitrogen flows under control of the first control 38, which is the period of cooling, the temperature reduction can be rather rapid and it will tend to cause overshoot of the temperature below the desired set point. In order to combat this effect, a second temperature sensor or thermistor 43 is set to sense the temperature inside of the inner enclosure 10 and energize the tandem control 42 via the leads 44. Tandem control 42 then applies current, in accordance with sensed temperature, through the leads 45 to a suitable heater 46 which is also located within the inner enclosure 10. The structure and operation of this control 42 will be fully described with reference to FIG. 4.

*First control*

Figure 3:
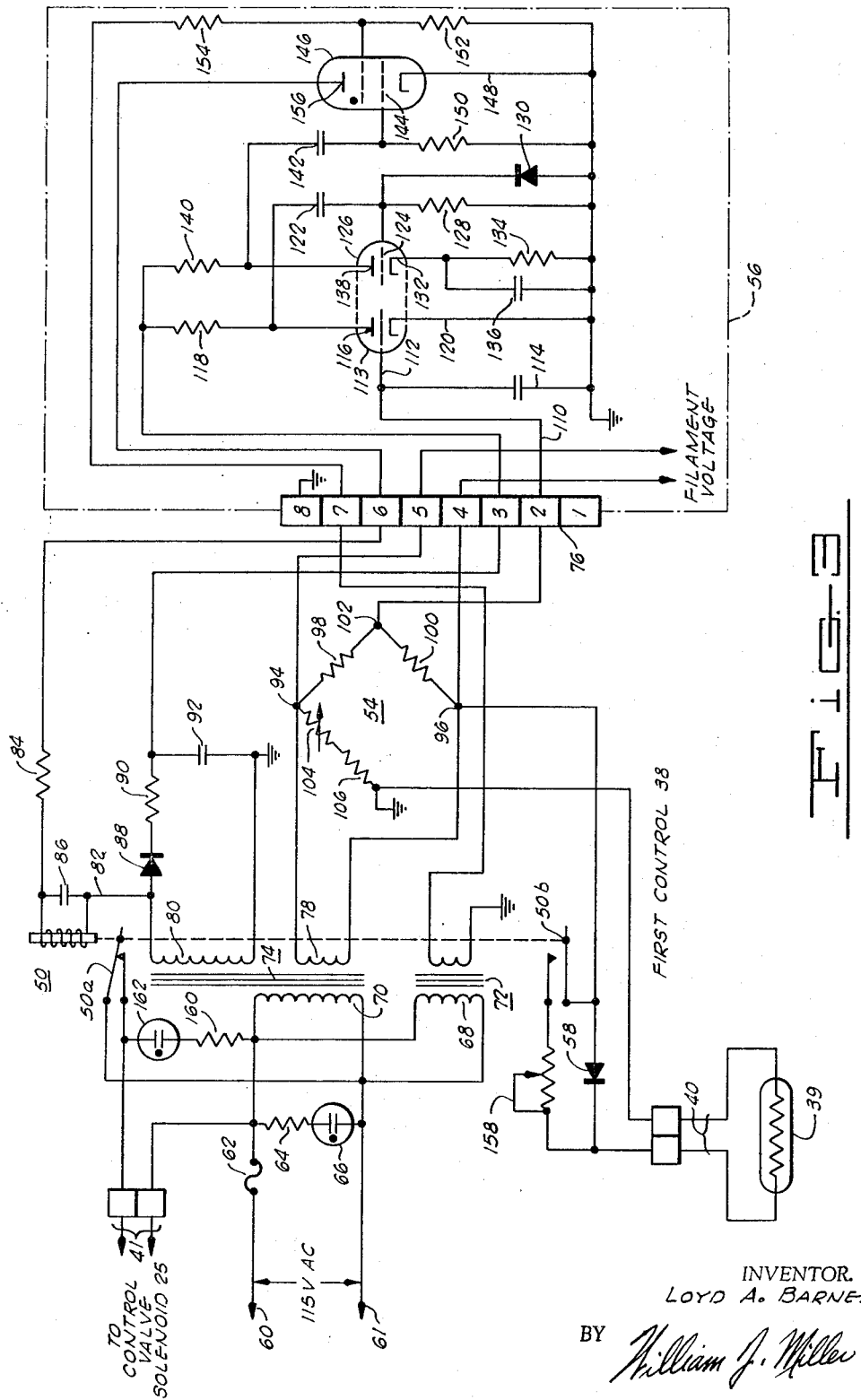
FIG. 3 is a schematic diagram of the first control assembly of FIG. 1.

FIG. 3 deals with the outer or first control unit 38 which functions to provide cooling of the interior chamber by turning "ON" the flow valve 25 in response to a temperature sensor. The circuit of FIG. 3 is shown with a control relay 50 in the relaxed, or no current position, wherein the valve solenoid 25 is energized by contacts 50a and liquid nitrogen is flowing to cool the system. When the thermistor 39 changes resistance sufficiently (at a preset level) to balance a bridge 54, an in-phase input signal to an amplifier 56 will cause the relay 50 to energize, thus opening contact 50a to close the solenoid valve 25 and stop the nitrogen flow into the cooling system. A contactor 50b, simultaneously operative with 50a, serves to effect by-pass of a diode 58 during the nitrogen flow "OFF" period, thus passing more average current through the thermistor 39 to cause it to anticipate the preset sensing level. This is a mechanism to combat overshoot in the temperature change and will be fully described later.

The equipment is supplied with line voltage at the inputs 60 and 61. A protective fuse 62 is provided in the line, and a limiting resistor 64 and neon glow tube 66 serve to indicate when the line power is applied. The input line voltage is applied in parallel to the respective primaries 68 and 70 of two transformers 72 and 74. The transformer 72 provides a 6.3 volt A.-C. output to pin No. 7 of an eight pin connector 76 and this voltage is employed in the amplifier 56 in a manner to be described. The second transformer 74 has two secondary windings; a winding 78 supplies 6.3 volts A.-C. across the bridge 54 and then to pins No. 4 and No. 5 of connector 76 to supply filament voltage to the amplifier 56. A second winding 80 of transformer 74 supplies one hundred and fifty volts A.-C. for use as plate voltage in the amplifier 56.

The one hundred and fifty volts A.-C. is tapped off by a lead 82 through the relay coil 50 and current limiting resistor 84 to pin No. 6 of connector 76 where it is supplied to the amplifier 56 for use as plate voltage as will be described. Capacitor 86 serves to protect against chatter effects in the relay 50 by maintaining precise current response. The one hundred and fifty volts A.-C. from the winding 80 is also rectified by the diode 88. The output from diode 88 is then conducted through the dropping resistor 90 and filtered by a relatively large capacitor 92 to provide a D.-C. voltage to pin No. 3 of connector 76. This voltage also is utilized as plate supply voltage in amplifier 56 and will be more fully described.

As was stated, the bridge 54 is supplied with 6.3 volts A.-C. across its points 94 and 96. One side of the bridge is made up of resistors 98 and 100 which should be of the same precise value and on the order of several hundred ohms, and the output from the bridge is taken from a point 102 and applied to pin No. 2 of connector 76. The other side of the bridge is comprised of a potentiometer 104, a limiting resistor 106 and the thermistor 39, with the point 108 being grounded. The potentiometer 104 is of relatively large value, to correspond to thermistor resistance values in the very cold temperature range, and can be adjusted to set the temperature at which the cooling system will commence operation.

The resistance 106 is merely a protective measure to limit the current flow when the equipment is at its highest temperatures; e.g., when first starting up the environmental chamber cooling system it may be as high as room temperature. In this warm condition the bridge is extremely unbalanced since the resistance of thermistor 39 will be very low and the resultant A.-C. signal at point 102 will be out-of-phase with the input or A.-C. time base present in the remainder of the circuit. As will become apparent as the description proceeds, the out-of-phase signal cannot trigger the amplifier 56 to shut off the nitrogen flow; however, as cooling progresses, the resistance of the thermistor 39 rises to a very high value, and at some point, as set by the potentiometer 104, it will balance the bridge to bring the A.-C. output at point 102 in phase with the applied time base.

The amplifier 56, preferably a type which can be designed to plug into a conventional octal socket (connector 76), employs two stages of amplification in a twin-triode tube and a thyratron control tube. The input is taken from pin No. 2 of connector 76 along a conductor 110 to the grid 112 of one triode 113. A shunt capacitor 114, of very small value, is connected between the grid 112 and ground to by-pass any high frequencies which may be present in the input signal. The plate 116 is supplied with D.-C. voltage from pin No. 3 of connector 76 through a plate load resistor 118. Since the cathode 120 is grounded, the triode 113 will conduct throughout an entire cycle, in accordance with the alternating input at grid 112, and the amplified signal as developed by the plate load resistance 118 will appear across a capacitor 122 where it is applied to the grid 124 of a second triode 126.

Grid leak bias is set for the grid 124 by a high resistance 128, and a diode 130, which serves as a positive clamp circuit, establishes the input grid signal at a desired voltage level. The cathode 132 is biased by a cathode resistor 134 and a by-pass condenser 136. The plate 138 also receives its supply voltage from pin No. 3 of connector 76 through a plate load resistor 140. The positively clamped signal applied at the grid 124 controls the tube current in conventional manner and an amplified signal as developed by the resistance 140 is conducted by a capacitor 142 to the grid 144 of a shield-grid thyratron 146.

In the thyratron 146, the cathode 148 is grounded and the grid 144 is biased by the grid resistor 150 to ground. The shield-grid potential is 6.3 volts A.-C. as present on pin No. 7 of the connector 76, and it is applied through the divider network consisting of the resistors 152 and 154. The thyratron plate voltage is the one hundred and fifty volts A.-C. which is conducted through the coil or relay 50 to pin No. 6 of connector 76, and then directly to plate 156 of the thyratron 146. Hence, the thyratron can only conduct during a portion of the positive half cycle of the plate voltage, and it fires then only when an in-phase signal is present at the grid 144 which would surmount the critical grid voltage level and fire the tube into conduction. When the thyratron fires, i.e., when an in-phase grid signal has been applied to the thyratron grid 144, the thyratron conducts heavily and current flows through the plate circuit and back through the coil of relay 50 to actuate or energize the relay; thus, contacts 50a open to close the control valve solenoid 25 and stop the flow of nitrogen into the system, and contacts 50b close to by-pass the diode 58 and apply full-wave current through the thermistor 39.

When the temperature has been lowered to the preset level, thermistor 39 has a resistance which is sufficient to balance the bridge output, thereby providing a signal to the amplifier 56 which will be in-phase with the thyratron plate voltage. This enables the thyratron to conduct and actuate relay 50 to cease the system cooling by shutting "OFF" the nitrogen valve (solenoid valve 25). During the cooling period (nitrogen "ON") the thermistor 39 voltage (6.3 volts A.-C.) is rectified by diode 58. With cooling "OFF," the system will heat up until the bridge unbalances a sufficient amount to shift the phase of the sensed signal and cease conduction in the thyratron; at which time, the cooling nitrogen gas is again turned "ON" and allowed to circulate in the system.

One of the big problems in such systems, when operating at extremely low temperatures, is that of temperature overshoot during the regulative excursions about the desired temperature level. For this reason, the diode 58 is switched out of the sensor circuit during the warming or nitrogen "OFF" period. In so doing, full-wave 6.3 volts A.-C. is applied to the thermistor 39 through a rheostat 158. This amounts to passing greater average current through the thermistor 39 which generates internal heat from power dissipation within the thermistor, and, effectively, causes the thermistor indication to lead the actual temperature level by a small amount. The amount of lead is adjustable by means of the rheostat 158 so that the thermistor 39 can be caused to sense the warming trend early to actuate the cooling supply at some predetermined time before the warming temperature excursion has been completed.

A second correction, cooling anticipation, is effected by placing the thermistor 39 directly in the stream of one of the gas jets 33 (see FIG. 1) so that it will sense the cooling trend early. Being so placed in one of the gas jets will cause the thermistor 39 to reach the set point resistance before the remainder of the circulation area has been cooled to the same degree; hence, this anticipation of the cooling trend will act to cut short the cold excursions about the mean temperature level. That is, an in-phase signal will be present sooner at the bridge output, and will enable the thyratron to conduct, thus energizing relay 50 and opening the A.-C. supply to the control valve solenoid so that coolant flow is turned "OFF." A limiting resistor 160 and neon glow tube 162 are placed in series across the control valve A.-C. line for the purpose of indicating when the control valve 25 is "ON," i.e., during the cooling period.

*Tandem control*

Figure 4:
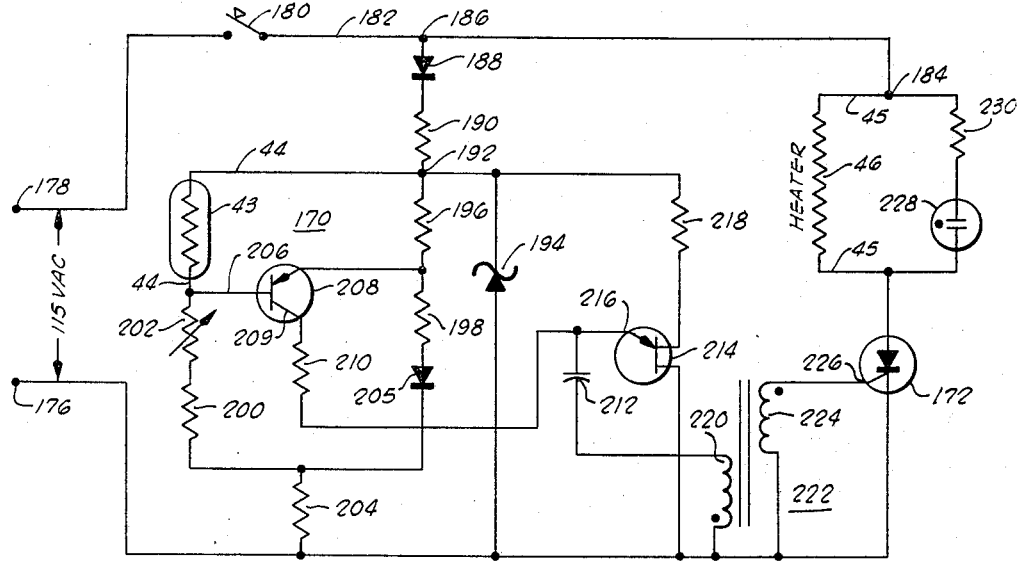
FIG. 4 is a schematic diagram of the second or tandem control assembly of the apparatus shown in FIG. 1.

Another circuit, the tandem control 42, is used to minimize the temperature-change excursions about the mean temperature and this is the subject of FIG. 4. This circuit operates from line A.-C. voltage and provides a thermistor 43 as one leg in a bridge circuit 170 which controls the firing point of a silicon controlled rectifier 172 to thus vary the amount of current which is passed through a heater element 46. The line voltage, 115 volts A.-C. is applied at terminals 176 and 178. A switch 180 controls energization of the circuit wherein a conductor 182, one side of the A.-C. line, is applied to the heater circuit at point 184 and to the bridge circuit 170 at point 186.

As to the bridge circuit 170, the A.-C. voltage is rectified by a diode 188 to conduct positive voltage (half-wave rectified) through the dropping resistor 190 to point 192. The positive D.-C. voltage at point 192 is clamped at a desired D.-C. voltage by the zener diode 194 in the manner of a voltage regulator. The clamp voltage has been chosen at plus twenty-two (+22) volts since this value is compatible with the requirements of the particular semi-conductors employed. The resistors 196, 198 and 200, potentiometer 202 and thermistor 43 form a bridge circuit between point 192 and ground, as biased by resistor 204. A diode 205 serves as a circuit compensator for balancing inherent temperature effects.

The bridge is properly maintained in the balanced condition when the thermistor 43 is at the set or control temperature and the potentiometer 202 serves as the balance calibration adjustment in this condition. When the sensed temperature drops below the preset value, the resistance of thermistor 43 increases to cause a decreased voltage at the base 206 of a transistor 208. This causes greater current to flow through the base 206, collector 209 and collector resistor 210 which allows a capacitor 212 to charge up more rapidly to the threshold voltage of a unijunction transistor 214. When the potential on the emitter 216 of the unifunction transistor 214 reaches the threshold of firing value, the transistor conducts through the base-one to base-two circuit and resistor 218, and the capacitor 212 is instantly discharged through the coil 220 of pulse transformer 222. This discharge of current through coil 220 induces a pulse into coil 224 which places sufficient trigger current on the gate electrode 226 to cause the positive avalanche conduction of the silicon controlled rectifier 172. This controlled conduction through the SCR 172 acts to enable the current flow through heater 46. A neon glow lamp 228 and a resistor 230 are paralleled with the heater element 46 to indicate the condition of energization.

Hence, as the temperature goes toward colder, the resistance of thermistor 43 increases, this allows increased collector current in transistor 208 so that capacitor 212 charges more quickly. This, in turn, causes the unijunction transistor 214 to fire sooner and thus trigger the silicon controlled rectifier 172 earlier in the cycle to allow greater average power through the heater element 46. As the increased heat is applied, the thermistor 43 warms up until it reaches the set point. In the event of a warmer temperature being sensed, the resistance of thermistor 43 decreases to effect the opposite results throughout the circuit. That is, the capacitor 212 is charged more slowly to fire the unijunction transistor 214 and, hence, the silicon controlled rectifier 172 is triggered later in the cycle to thus allow less average power through the heater element 46. The circuit is capable of continuous and smooth control of heat in infinitesimal amounts in response to the need.

*Operation*

Both enclosures, the inner enclosure 10 (see FIGURE 1) and the outer enclosure 16, are fabricated from a heat-insulative material, e.g. styrofoam. The outer enclosure serves to insulate the cooling space 19 and evaporator coil 22 from the room or area outside. The inner enclosure 10 serves as a filter or smoothing device by lessening the effect of the relatively high, temperature-changing surges caused by the cooling equipment in circulation space 19, so that these surges have a minimal effect on the controlled sample space 14 within the enclosure 10. This smoothing effect has proven to be a valuable function, since one of the main problems to be overcome in a low-temperature environmental chamber is that of maintaining the proper temperature with a minimum of excursion above and below the desired set point.

In operation, referring again to FIG. 1, the liquid coolant is introduced at 24 to the solenoid controlled valve 25. For operation at the desired temperatures as disclosed herein, about minus (−) 175 degrees centigrade, liquid nitrogen has been used to good advantage. The description proceeds assuming the use of this coolant, but it should be understood that other well-known coolants may be utilized, depending upon the temperature range of operation. The solenoid valve 25 is controlled by the automatic action of the first control 38 in response to thermistor 39 to effect an "ON" and "OFF" control of the coolant flow. When turned "ON," liquid coolant can flow into the trap area 28 (FIG. 2) and then through the series of turns of the evaporator coil 22 to the exhaust tube portion 29; then the dispersal holes 30 each emits a gas jet 33 to set up the circulation flow of coolant as shown by dark arrow 34 in FIG. 1. The nitrogen is in the liquid state when introduced through the valve 25, but the evaporator coil 22 is made with sufficient length to ensure that the nitrogen always will have attained its gaseous state by the time that it reaches the gas exhaust tube 29.

The pressure contained in the liquid nitrogen source is sufficient to ensure proper flow through the cooling coil system when flow is enabled by the valve 25. By placing the valve directly in the liquid line, the valve 25 is always purged by the vapor phase before the liquid phase begins, and thus there is no problem of minute moisture accumulation and consequent valve freezing and sticking. This purge effect is present because; when the warm unit is first turned on, dry nitrogen gas flows at first, clearing the evaporator and inner cavities of moisture, until all of the evaporator tubing next to the nitrogen source cools sufficiently to carry the liquid. Cooling will then proceed both by heat exchange between the evaporator coil 22 and enclosure 10, and by the cold gas circulation from the exhaust jets 30 around the circulation space 19. The orifice 37 is designed to provide a certain discharge restriction in accordance with the desired interior pressure. In some uses a relief valve may be desirable.

Since the enclosures themselves are formed of material having excellent heat insulative properties, there is quite a large difference in the temperature between the inner chamber 14, the controlled environment space, and the coolant circulation space 19. The space 19 is maintained much colder by virtue of the fact that it contains the evaporator coils 22 and the nitrogen circulation from the plural gas jets 33. This condition has been used advantageously since it has been found that by proper placement of the thermistor 39 directly in or quite near one of the jets 33, it can be caused to sense a cooling trend early or, in effect, to anticipate the cooling trend (relative to the chamber 14) and stop the flow of liquid coolant early in such a manner that less cooling temperature overshoot will be sensed in the chamber 14.

To further compensate for temperature overshoot on the warming trend, another sensing anticipation is interjected into the electrical characteristics of the temperature controller (first control 38). Referring to FIG. 3 and particularly the thermistor 39 circuit, the energization path from point 96 of bridge 54 is through the diode 58 to the thermistor 39 and back to the grounded point on bridge 54. Thus, during the "ON" period of nitrogen flow, i.e., the cooling period, the thermistor 39 conducts half-wave current and relay 50 is not energized. When the cooling set point is reached (sensed early by thermistor location as set forth above) relay 50 is energized to stop nitrogen flow into the system and to by-pass the diode 58 in the thermistor energizing circuit. This switches thermistor 39 onto full-wave current having twice the average power such that considerably more internal heat is generated in the thermistor 39 due to the increased internal power dissipation; hence, the thermistor 39 will then sense the warming trend set point early to once again de-energize the relay 50, allowing nitrogen flow to cool the system and once again allowing diode 58 to rectify the thermistor current during the cooling period.

In addition to the first control 38, which senses both the cooling and warming trends early and, in effect, anticipates the condition of heat in the system to result in a faster ON-OFF cycling rate and reduced temperature excursions; the tandem control 42 is employed to apply small amounts of heat in response to indications of a second thermistor 43. This heat is applied in such a manner and at such a point in the temperature cycle, that it serves to reduce still further any temperature excursions.

Figure 5:
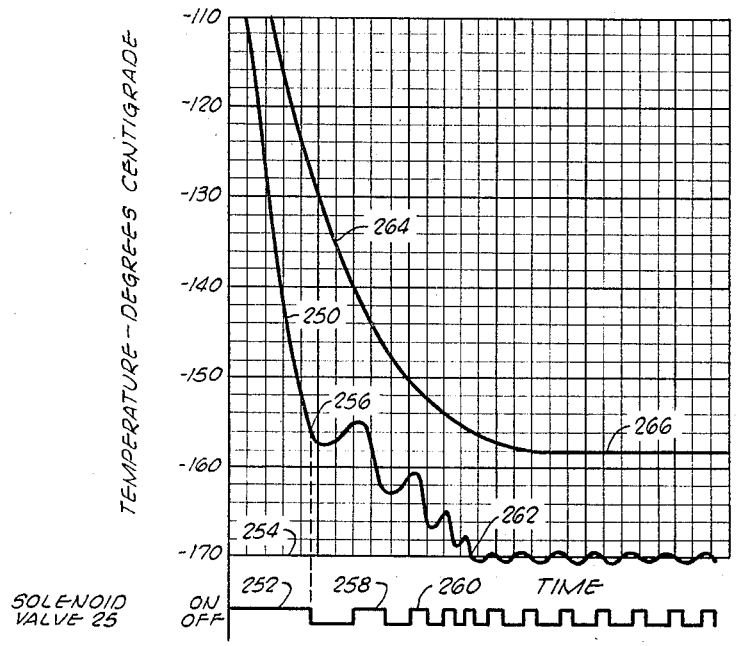
FIG. 5 is a time vs. temperature graph showing cooling relationships present in the environmental chamber of FIG. 1; and also a periodicity table showing coincidence of the control function.

Referring to FIG. 5, there is a graph showing temperature curves through a period of cooling, and across the bottom there is added a time-coincident representation of the switching action of the solenoid valve 25. The curve 250 represents the temperature in the circulation space 19. During the initial nitrogen "ON" period, as shown at plateau 252, the circulation space 19 is rapidly cooled down. The first control 38 set point would be the line 254 at minus (—) 170 degrees centigrade. Since the thermistor has been optimally placed in the colder region of space 19, e.g., directly in a coolant jet 33, it senses the set point early and begins ON-OFF control of the temperature early, as at point 256. Through a series of cooling periods, during which nitrogen is enabled to flow (times represented by 258, 260, etc.), the temperature of space 19 finally reaches the set point line 254 at the point 262 and continues to undulate about the set point during the remainder of the operation. The control apparatus maintains the temperature of space 19 within plus or minus one degree of temperature variation.

Due to the fact that the heat insulated inner enclosure 10 acts as a filter or smoothing device to heat transfer, the inner chamber 14 follows at a slightly higher temperature having still less temperature fluctuation. This inner chamber temperature is shown by the heavy line 264 and depicts a circumstance where the inner chamber temperature follows down and stabilizes at minus (—) 160 degrees centigrade as shown at the curve portion 266. Thus the actual set point temperature within inner chamber 14 is at minus 160 degrees centigrade and that temperature will be maintained within two-tenths of a degree centigrade. Normally the set point of the tandem control 42 would be set five to ten degrees higher than the set point of control 38 and more nearly at the actual temperature of inner chamber 14. The curves 250 and 264 represent the control performance under hypothetical conditions. The actual temperature excursions and the times involved will vary depending on the inner chamber temperature chosen, the temperature separations, and the thermal dynamics of the system.

In some uses of the system the second control and heater are not necessary. It has been found that with proper placement of the outer thermistor 39, very reliable temperature control of the inner chamber 14 can be carried out with just the first control 38 acting to regulate the nitrogen flow. In such an application as this, the temperature smoothing effect of the insulative material of the enclosure 10 becomes a very important factor and, for some temperature ranges, single control operation provides an extremely stable inner chamber temperature.

The specification has set forth a novel temperature controlled enclosure which maintains very low temperatures with an extremely small amount of temperature fluctuation. The equipment is continually adjustable as to temperature, it is compact, and it requires a minimal amount of externally located equipment since it employs a single pressurized coolant source which is directly connected to the system cooling facility. The equipment provides a temperature-controlled chamber wherein temperature excursion overshoot is greatly minimized by the use of the novel insulation, temperature sensing and control techniques as disclosed herein.

Changes may be made in the combination and arrangement of elements as heretofore set forth in this specification and shown in the drawings, it being understood, that changes may be made in the embodiments disclosed without departing from the spirit and scope of the invention as defined in the following claims.

I claim:

1. Apparatus for maintaining a chamber at a predetermined low temperature with a minimum of variations in such temperature, comprising:

a first insulated housing forming the chamber;

a second insulated housing enclosing the first housing with space between the first and second housings surrounding the first housing;

a conduit means formed as a coil having multiple turns and disposed to surround the first housing in close proximity thereto, said final turn of said coil disposed to have two series of gas exhaust holes on opposite sides of the first housing with all of said holes in each series being oriented to disperse a spray of coolant in the same circumferential direction;

a supply of coolant;

valve means connecting the coolant supply to said conduit means;

a temperature sensor positioned in said space in proximity with said conduit means; and control means connected to said valve means and said sensor for stopping the flow of the coolant into said conduit means at a first low temperature below said predetermined temperature and starting the flow of coolant into said conduit means at a second, higher, low temperature below said pre-determined temperature.

2. An apparatus as set forth in claim 1 wherein:

said temperature sensor is positioned directly in a coolant spray.

3. Apparatus for maintaining a chamber at a predetermined low temperature with a minimum of variations in such temperature, comprising:

a first insulated housing forming the chamber;

a second insulated housing enclosing the first housing with space between the first and second housings surrounding the first housing;

conduit means positioned in said space and forming a heat exchanger;

a supply of coolant;

valve means connecting the coolant supply to said conduit means;

a temperature sensor positioned in said space in proximity with said conduit means; and control means including said temperature sensor for providing an alternating current control indication, relay means for controlling the operation of said coolant supply valve, and reactance means controlling said relay in response to said alternating-current control indication, said control means connected to said valve means and said sensor for stopping the flow of coolant into said conduit means at a first low temperature below said pre-determined temperature and starting the flow of coolant into said conduit means at a second, higher, low temperature below said pre-determined temperature.

4. An apparatus as set forth in claim 3 wherein:

said means including said temperature sensor is a resistive bridge circuit having a thermistor as one leg thereof.

5. An apparatus as set forth in claim 4 wherein:

said relay means closes the coolant supply valve when energized and opens the supply valve when de-energized, and said reactance means conducts to energize said relay to cease coolant flow when said thermistor resistance value balances the bridge circuit.

6. An apparatus as set forth in claim 4 and characterized further to include:

half-wave rectifier means supplying alternating current to said bridge circuit, and contacts controlled by said relay and connected to bypass said rectifier upon energization of said relay means thereby doubling the current through the thermistor to induce self-heating when said valve is closed.

7. Apparatus for maintaining a chamber at a predetermined low temperature with a minimum of variations in such temperature, comprising:

a first insulated housing forming the chamber;

a second insulated housing enclosing the first housing with space between the first and second housings surrounding the first housing;

conduit means positioned in said space and forming a heat exchanger;

a supply of coolant;

valve means connecting the coolant supply to said conduit means;

a temperature sensor positioned in said space in proximity with said conduit means; and control means connected to said valve means and said sensor for stopping the flow of the coolant into said conduit means at a first low temperature below said pre-determined temperature and starting the flow of coolant into said conduit means at a second, higher, low temperature below said pre-determined temperature, said control means comprising:

an A.-C. voltage supply;

a resistance bridge network having said temperature sensor connected as one leg thereof and being supplied with A.-C. voltage;

an amplifier connected to receive the bridge output at the grid and having an A.-C. plate voltage supplied thereto;

a relay having contacts for closing the coolant supply valve when said relay is energized, the actuating coil of said relay being connected in series with the plate of said amplifier, said amplifier being rendered conductive when the A.-C. bridge output voltage on the grid is in phase with the A.-C. plate voltage to thereby energize the relay and thus close the supply valve to cease cooling.

8. An apparatus as set forth in claim 7 and characterized further to include:

half-wave rectifying means supplying said A.-C. voltage to said temperature sensor, and said relay having a second pair of contacts for bypassing said rectifier when the relay becomes energized to thereby apply full-wave voltage to the temperature sensor during the period of ceased coolant flow.

9. Apparatus for maintaining a chamber at a pre-determined low temperature with a minimum of variations in such temperature, comprising:

a first insulated housing forming the chamber;

a second insulated housing enclosing the first housing with space between the first and second housings surrounding the first housing;

conduit means positioned in said space and forming a heat exchanger;

a supply of coolant;

valve means connecting the coolant supply to said conduit means;

a temperature sensor positioned in said space in proximity with said conduit means;

control means connected to said valve means and said sensor for stopping the flow of the coolant into said conduit means at a first low temperature below said pre-determined temperature and starting the flow of coolant into said conduit means at a second, higher, low temperature below said pre-determined temperature; and a tandem control means for generating heat within the chamber in response to the temperature as sensed in the chamber to thereby correct for overshoot in the temperature cycles.

10. An apparatus as set forth in claim 9 wherein said tandem control means comprises:

a second temperature sensor disposed within the chamber, a heater element disposed within the chamber, and a reactance device controlling conduction through said heater element in response to said second temperature sensor.

11. An apparatus as set forth in claim 10 wherein:
said temperature sensor is a thermistor, and
said reactance device is a solid state device.

12. An apparatus as set forth in claim 9 wherein said tandem control means comprises:
   a thermistor disposed within said chamber and connected as one leg of a bridge circuit,
   reactance means conducting in response to an input received from said bridge circuit,
   current-responsive heating means located within said chamber, and
   second reactance means conducting in response to the conduction of said first reactance means and thereby controlling the average amount of current through said heating means in direct order to the thermistor resistance.

References Cited by the Examiner

UNITED STATES PATENTS

| | | | |
|---|---|---|---|
| 1,264,866 | 4/1918 | Sauers | 165—136 |
| 1,602,890 | 10/1926 | Evans | 62—314 |
| 1,758,215 | 5/1930 | Bossini et al. | 62—77 |
| 2,077,865 | 4/1937 | Wile | 62—224 |
| 2,131,119 | 9/1938 | Root et al. | 62—106 |
| 2,190,289 | 2/1940 | Higham | 62—440 |
| 2,314,598 | 3/1943 | Phelan | 62—342 |
| 2,398,029 | 4/1946 | Morrison | 62—516 |
| 2,446,686 | 8/1948 | Behrens | 62—255 |
| 2,475,755 | 7/1949 | Pearson | 62—514 X |
| 2,496,816 | 2/1950 | Schlumbohm | 62—223 X |
| 3,127,755 | 4/1964 | Hemery | 62—514 X |
| 3,217,507 | 11/1965 | Stryker | 62—514 X |

MEYER PERLIN, *Primary Examiner.*